(12) United States Patent
Blankenbeckler et al.

(10) Patent No.: US 9,384,484 B2
(45) Date of Patent: *Jul. 5, 2016

(54) SECURE CONTENT DISTRIBUTION SYSTEM (71) Applicant: Adobe Systems Incorporated, San Jose, CA (US)

(72) Inventors: David L. Blankenbeckler, Longmont, CO (US); William Almon, Jr., Longmont, CO (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/269,121

(22) Filed: May 3, 2014

(65) Prior Publication Data

US 2014/0324704 A1      Oct. 30, 2014

(51) Int. Cl.
| H04L 29/06 | (2006.01) |
| G06Q 20/38 | (2012.01) |
| G06F 21/10 | (2013.01) |
| G11B 20/00 | (2006.01) |
| G11B 20/10 | (2006.01) |
| H04L 9/28 | (2006.01) |

(Continued)

(52) U.S. Cl.
CPC ............ *G06Q 20/3829* (2013.01); *G06F 21/10* (2013.01); *G11B 20/0021* (2013.01); *G11B 20/00086* (2013.01); *G11B 20/00224* (2013.01); *G11B 20/00253* (2013.01); *G11B 20/00449* (2013.01); *G11B 20/00862* (2013.01); *G11B 20/00869* (2013.01); *G11B 20/10* (2013.01); *H04L 9/28* (2013.01); *H04L 9/32* (2013.01); *H04L 63/0464* (2013.01); *G11B 2220/2541* (2013.01); *G11B 2220/2562* (2013.01); *G11B 2220/2579* (2013.01); *H04L 9/06* (2013.01); *H04L 2463/101* (2013.01)

(58) Field of Classification Search
CPC ............... H04L 2463/101; H04L 63/0464; H04L 9/06; H04L 9/28; H04L 9/32; G06F 21/10; G06Q 20/3829; G11B 20/00086; G11B 20/0021; G11B 20/00224; G11B 20/00253; G11B 20/00449; G11B 20/00862; G11B 20/00869; G11B 20/10; G11B 2220/2541; G11B 2220/2562; G11B 2220/2579
USPC .......................................................... 713/155
See application file for complete search history.

(56) References Cited

U.S. PATENT DOCUMENTS

| 7,124,436 B2 | 10/2006 | Okaue et al. |
| 7,596,812 B2 | 9/2009 | Li et al. |
| 2002/0194095 A1 | 12/2002 | Koren |

(Continued)

*Primary Examiner* — Kambiz Zand
*Assistant Examiner* — Abiy Getachew
(74) *Attorney, Agent, or Firm* — Kilpatrick Townsend & Stockton LLP (57) ABSTRACT

A user selection of one or more of a plurality of content is received. The selected content is encrypted by a first encryption key that is remote and unknown to the distribution server. Payment information associated with the user selection is also received and verified. The selected content from is retrieved from a remote database. The first encryption key corresponding to the selected content to decrypt the encrypted content corresponding to the user selection is obtained. Decryption is performed by a hardware-based engine of the distribution server that is isolated from a host processor of the distribution server. The content corresponding to the user selection is encrypted according to a second encryption key that is known to the distribution server.

19 Claims, 5 Drawing Sheets

(51) Int. Cl.
*H04L 9/32* (2006.01)
*H04L 9/06* (2006.01)

(56) References Cited

U.S. PATENT DOCUMENTS

| | | |
|---|---|---|
| 2003/0056118 A1 | 3/2003 | Troyansky et al. |
| 2004/0153373 A1 | 8/2004 | Song et al. |
| 2004/0215740 A1 | 10/2004 | Frank et al. |
| 2005/0010790 A1 | 1/2005 | Lang et al. |
| 2005/0021396 A1 | 1/2005 | Pearch et al. |
| 2005/0021961 A1 | 1/2005 | Hanks et al. |
| 2005/0091491 A1 | 4/2005 | Lee et al. |
| 2006/0010394 A1 | 1/2006 | Chaudhri et al. |
| 2006/0059437 A1 | 3/2006 | Conklin, III |
| 2006/0161480 A1 | 7/2006 | Christensen |
| 2006/0173794 A1 | 8/2006 | Sellers et al. |
| 2007/0033393 A1 | 2/2007 | Ganesan et al. |
| 2007/0061724 A1 | 3/2007 | Slothouber et al. |
| 2007/0064936 A1* | 3/2007 | Kasahara et al. ............ 380/45 |
| 2007/0162850 A1 | 7/2007 | Adler et al. |
| 2007/0192695 A1 | 8/2007 | Grotjohn et al. |
| 2007/0198432 A1* | 8/2007 | Pitroda et al. ............ 705/64 |
| 2007/0265966 A1 | 11/2007 | Kahn et al. |
| 2007/0300236 A1* | 12/2007 | Hing ............ 719/315 |
| 2008/0010133 A1 | 1/2008 | Pyhalammi et al. |
| 2008/0010196 A1 | 1/2008 | Rackley, III |
| 2008/0034314 A1 | 2/2008 | Louch et al. |
| 2008/0059571 A1 | 3/2008 | Khoo |
| 2008/0083003 A1 | 4/2008 | Biniak et al. |
| 2008/0097871 A1 | 4/2008 | Williams et al. |
| 2008/0126937 A1 | 5/2008 | Pachet |
| 2008/0162722 A1 | 7/2008 | Cadden |
| 2008/0168367 A1 | 7/2008 | Chaudhri et al. |
| 2008/0195483 A1 | 8/2008 | Moore |
| 2008/0222232 A1 | 9/2008 | Allen et al. |
| 2009/0018920 A1 | 1/2009 | Lerman et al. |
| 2009/0097642 A1 | 4/2009 | Schnell et al. |
| 2009/0106551 A1 | 4/2009 | Boren et al. |
| 2010/0095113 A1 | 4/2010 | Blankenbeckler et al. |
| 2010/0125534 A1 | 5/2010 | Brandes et al. |
| 2010/0138764 A1 | 6/2010 | Hatambeiki et al. |
| 2011/0125594 A1 | 5/2011 | Brown et al. |

* cited by examiner

SECURE CONTENT DISTRIBUTION SYSTEM

CROSS-REFERENCE TO RELATED APPLICATIONS

This application is a continuation of U.S. patent application Ser. No. 12/249,906, filed on Oct. 11, 2008, the content of which is incorporated herein by reference in its entirety.

TECHNICAL FIELD

The present invention relates generally to the distribution of digital content. More particularly, the present invention relates to a system for the secure distribution of digital content such as digitized motion pictures to consumers.

BACKGROUND

Consumers commonly obtain home access to digitized content such digitized motion pictures by renting medium storing the digitized content. For example, a consumer will obtain Digital Video Discs (DVDs) that store the desired digital content. The DVD provider must then warehouse a substantial number of DVDs to satisfy the varied needs of consumers.

Because of the required warehousing, a DVD provider faces substantial costs to maintain and organize their DVD inventory. It would be far more convenient for the DVD provider to simply burn the desired DVD upon an order from a consumer. The DVD provider would then merely need to stock blank discs and burn them with retrieved content from a centralized or distributed database storing the digital content. However, content providers such as studios are quite reluctant to allow their content to be stored in such a database due to piracy and other unauthorized access.

Accordingly, there is a need in the art for secure digital content distribution systems.

SUMMARY

To address these needs, methods, non-transitory computer-readable medium, and computer devices are provided.

In accordance with one embodiment, a user selection of one or more of a plurality of content is received. The selected content is encrypted by a first encryption key that is remote and unknown to the distribution server. Payment information associated with the user selection is also received and verified. The selected content from is retrieved from a remote database.

The first encryption key corresponding to the selected content to decrypt the encrypted content corresponding to the user selection is obtained. Decryption is performed by a hardware-based engine of the distribution server that is isolated from a host processor of the distribution server. The content corresponding to the user selection is encrypted according to a second encryption key that is known to the distribution server.

This and other aspects of the invention will become more apparent from the following drawings and description.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Reference will now be made in detail to one or more embodiments of the invention. While the invention will be described with respect to these embodiments, it should be understood that the invention is not limited to any particular embodiment. On the contrary, the invention includes alternatives, modifications, and equivalents as may come within the spirit and scope of the appended claims. Furthermore, in the following description, numerous specific details are set forth to provide a thorough understanding of the invention. The invention may be practiced without some or all of these specific details. In other instances, well-known structures and principles of operation have not been described in detail to avoid obscuring the invention.

Figure 1:
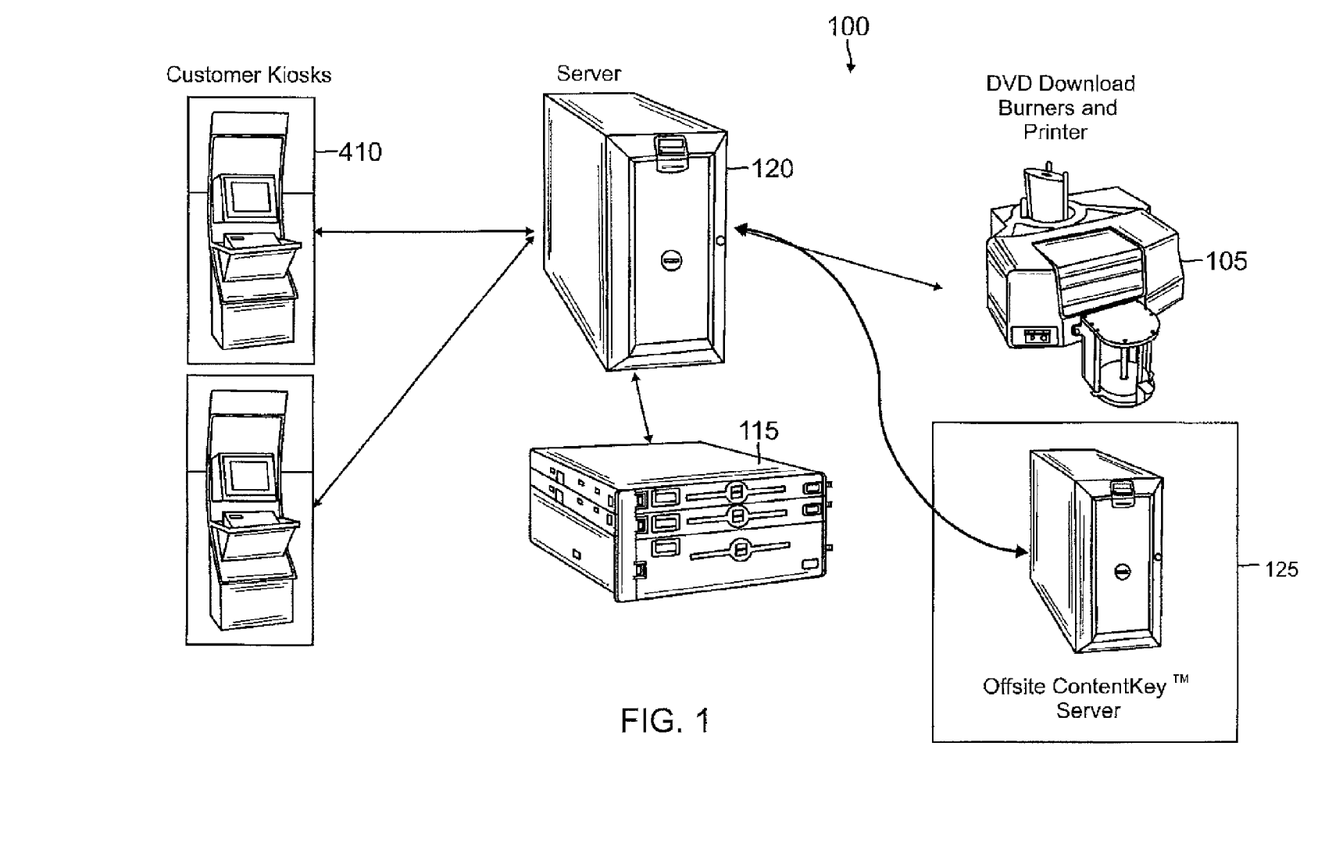
FIG. 1 is a block diagram for an example secure content distribution system.

Turning now to the drawings, FIG. 1 illustrates an example content distribution system 100. System 100 includes a DVD download writer (burner) 105 that will write optical discs with encrypted digital content as known in the art. Although described as a DVD burner, device 105 may comprise any suitable storage medium recorder. The following discussion will assume that the digital content written by DVD burner 105 is encrypted according to the Content Scrambling System (CSS) that is conventionally used for DVDs. The video format used in such conventional DVDs is established by the Moving Pictures Expert Group 2 (MPEG2). However, it will be appreciated that the media that a consumer receives from system 100 may be encoded using different video protocols such as MPEG4, MPEG1, H.264, WMV, or other digital video formats. These video formats may be encrypted according to alternative encryption techniques such a Microsoft™ digital rights management (DRM) scheme as opposed to a CSS encryption.

In system 100, a customer selects the digital content they desire to download through a kiosk 110. However, a customer could also make their selection online through a web browser or other user interfaces. The digital content that a customer may download is stored in a database 115. This database may be physically integrated with system 100 or may be a remote database accessed through the Internet. Because a remote database will then be throttled by the bandwidth limitations that a given system 100 faces depending upon their Internet access methods (such as DSL, T1, etc.), a database integrated with system 100 will generally allow much faster downloads—a speed advantage that is particularly advantageous should the desired content be high definition video due to the large amounts of data that will need to be downloaded.

The customer terminals such as kiosks 110 couple to the database through a system server 120. Database 115 may store the digital content provided through system server 120 through a variety of storage techniques. For example, database 115 may include a plurality of hard disk drives organized according to the Trusted Computing Group (TCG) Full Disk Encryption (FDE) protocol. The hard disk drives may be organized as a Redundant Array of Independent Disks (RAID) drive or as a Network Attached Storage (NAS) device. Because RAID drives organize their data with striping across the disks, an interloper with just access to any one drive will simply have mere portions of the stored content.

The content supplied by a content provider and stored to the database is offline encrypted using, for example, a first encryption protocol such as the Advanced Encryption Standard (AES) encryption scheme. Such an offline encryption is thus not performed by system 100 but instead under the control of the content provider such that system 100 does not have access to the corresponding decryption key(s). Before storing the offline-encrypted content in database 115, system 100 performs an additional encryption such that the resulting stored content is doubly-encrypted. For example, system 100 may doubly encrypt the stored content using a second encryption protocol such as the FDE HDD and TCG protocol described further herein.

System 100 thus implements a double encryption (such as FDE and AES) using an offline first encryption protocol and a second encryption protocol. To provide heightened security, neither the FDE decryption key nor the AES key is stored in database 115. For example, the FDE key may be obtained from a Trusted Platform Module (TPM) or from a USB dongle. Managers (administrative users) for system 100 would thus authenticate themselves to gain access to the FDE-encrypted data in database 115. Database 115 would then strip the FDE encryption from the stored data. It may thus be appreciated that clear text content never exists in the database. The database may be easily updated with new content through, for example, an Internet coupling in that the content provided to system 100 is always encrypted according to a first encryption protocol such as AES. In that regard, database may be smaller than that maintained by a content provider (e.g, 20 TB of storage as compared to 500 TB for the content provider). Should an order for content be placed outside of what is maintained in database 115, the content could be downloaded into database 115 from the content provider.

To provide further heightened security, the AES key is downloaded by server 120 from a remote content key server 125 controlled by the content provider. System server 120 receives the key at an internal encryption/decryption engine such that the a host microprocessor running within system server 120 never "sees" the AES key. The embedded encryption/decryption engine may be implemented, for example, as an application specific integrated circuit (ASIC) or as a configured programmable logic device (PLD). The interaction of this engine with the "host" (e.g., a microprocessor running as the brain for system server 120) may occur according to the TCG FDE protocol as disclosed in U.S. application Ser. No. 12/025,777, filed Feb. 2, 2008, the contents of which are incorporated by reference. This protocol will be further described herein. Because a content provider may control and monitor the activity of remote content key server 125, the content provider will know how many times a given content such as a video has been downloaded and thus obtain the appropriate payment or license fee. In other words, suppose system 100 indicates that a certain video has been downloaded a certain number of times: the content provider will be able to verify the accuracy of such accounting through the corresponding key downloads from content key server 125.

From a consumer viewpoint, obtaining content from system 100 will typically be less time consuming than physically browsing through a provider's DVD inventory as is practiced at conventional video outlets. The customer would select their desired content (remotely or through kiosk 110), the AES and FDE keys retrieved so that system server 120 may decrypt the desired content retrieved from database 115, and the decrypted content (although still CSS scrambled) burned to a DVD disc by burner 105. Burner 105 may be integrated with a printer to print the jewel case holding the DVD disc with the appropriate movie cover.

If the disc is to be burned according to the CSS MPEG2 format and the video source file was not in this particular format, a video transcoding function may be performed within system server 120 to convert the source file from its native format to MPEG2 with CSS encryption. This translation may be performed by system server 120 using a desired hardware or software implementation.

Figure 2:
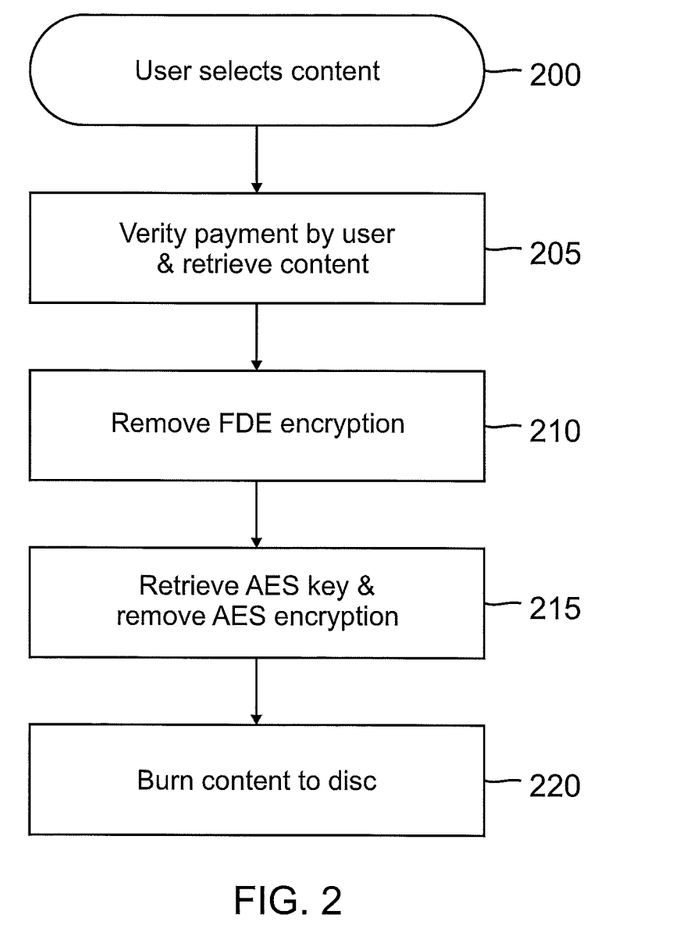
FIG. 2 is a flow chart for a method practiced by the system of FIG. 1.

The process of creating a DVD according to system 100 may be better understood with reference to the flowchart shown in FIG. 2. In an initial step 200, a user selects desired content for downloading such as through interaction with a kiosk 110 of FIG. 1. System 100 may then verify payment by the user in a step 205 so that the corresponding doubly-encrypted content may be retrieved from database 115 and provided to the encryption/decryption engine within system server 120. This engine then removes the FDE encryption of the retrieved content in a step 210. In a step 215, system server 120 retrieves the appropriate AES key(s) from remote content key server 125 and removes the AES encryption of the retrieved content. Finally, in a step 220, server 120 may provide the resulting decrypted content (although it may be CSS scrambled) to disc recorder 105 so that a DVD disc is created with the selected content.

It will be appreciated that the first encryption protocol used to provide the offline encryption of the content provided to database 115 need not be AES but could be other suitable encryption protocols such as the Data Encryption Standard (DES) protocol. Similarly, the second encryption protocol need not be the TCG FDE protocol as discussed in U.S. application Ser. No. 12/025,777. However, because this FDE protocol provides additional security, it will be explained further as follows.

Figure 3:
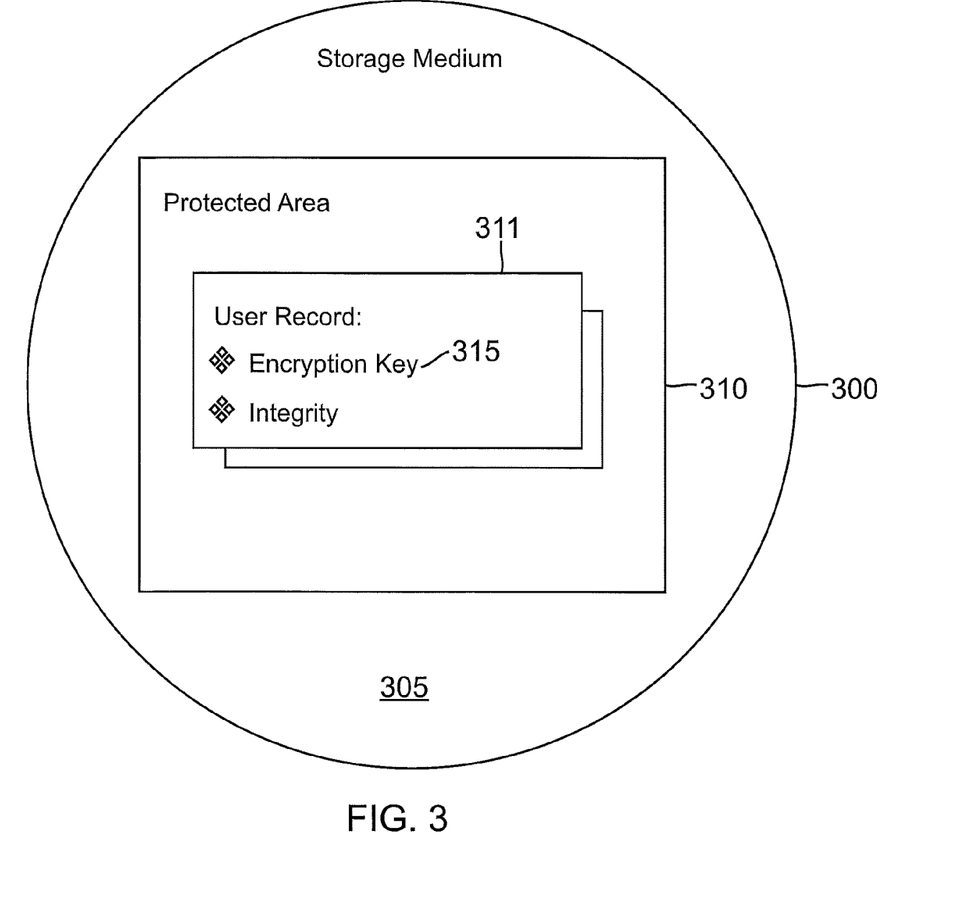
FIG. 3 illustrates an example storage medium for a database in the system of FIG. 1.

Turning now to FIG. 3, an example storage medium 300 for database 115 is illustrated. Medium 300 includes a user area 305 that contains the protected content. A host microprocessor such as the server microprocessor discussed above may be authenticated to the embedded encryption/decryption engine so as to establish an authenticated communication channel between the host and the engine.

Given this authenticated host, a user or other entity may then authenticate itself to the engine through the authenticated communication channel. The latter entity authentication may also be denoted as a "log on" to distinguish it from the necessary host authentication. Given these two events, trust has been established between the host and the engine such that the engine will access security information in a secure provider (SP) area 310. Parts of the SP area may be encrypted as will be explained further herein. Each administrative user associates with its own user record 311 in the SP area. If there is a plurality of users, there is thus a plurality of user records in SP area 310.

During log on, the administrative user of system 100 provides a pass code, which may be variable in length or have a fixed length. A pass code may be as simple as an alphanumeric name such as "username1" or it may be more sophisticated such as a code derived from a biometric scanner. Alternatively, a pass code may be a machine-provided code as provided by the host or from devices networked with the host. The engine processes the user's pass code through a hash function such as, for example, the National Security Agency (NSA) SHA-256 hash to create a corresponding derive key (DK) 315. It will be appreciated that other types of hash functions may also be used. It may thus be seen that each user may associate (upon presentation of the appropriate pass code) with its own DK. Alternatively, all administrative users may associate with the same DK. Within each user record, certain elements such as an identification of the user are unencrypted. Thus, an administrative user of system 100 may peruse the list of available users without having performed a log on. A user, having selected the appropriate record associated with the user's name, may then log on by providing the corresponding pass code to the engine. The engine will then process the pass code to uncover the corresponding DK. Portions of each user record are encrypted according to the corresponding DK. Thus, the engine may then decrypt the encrypted portions of the user record using the DK to provide an un-encrypted user record. Because a user record is at least partially encrypted, as used herein "user record" without a qualifier such as "un-encrypted user record" refers to the partially-encrypted user record. Each user record includes an integrity check, which may also be denoted as an entity authentication code (EAC). For example, the pass code and/or also other factors in the user record may be hashed using, for example, the SHA-256 hash function to generate an EAC. This EAC is encrypted and forms part of the user record. Upon decryption of the user record, the pass code and other recovered user record entries may then be hashed and the result compared to the decrypted EAC entry. If these entries match, the user's authenticity is verified. If the integrity check matches, then the log on is completed such that the encryption/decryption engine considers the user authenticated.

As discussed earlier, the user area may be entirely encrypted according to a full disk encryption (FDE) key such as a 128-bit or 256 bit-Advanced Encryption Standard (AES) key. This FDE key is encrypted within the SP. Each user record includes a protected storage area (PSA) key that decrypts the encrypted FDE key. Each user record's PSA key is encrypted by the corresponding DK such as through 128-bit or 256-bit AES. It will be appreciated, however, that other encryption protocols may also be used. Thus, it may be seen that each user record's encrypted PSA key is unique to that record. Upon authentication of a user, the engine has access to the un-encrypted PSA key (which may be seen to be the same for all user records) so that the FDE key may be recovered by decrypting the encrypted FDE key using the PSA key. At this point, the engine may then perform "on-the-fly" protected reads to the user area as well as protected writes to the user area using the FDE key.

Note the advantages of such an entity authentication and security protocol:

An administrative user may only access the protected content in the user area if they know the pass code. The pass code is not stored in database 115 so that unless appropriate credentials are presented (a pass code received from an authenticated host), the SP area cannot be decrypted. In other words, no keys are stored in firmware with the encryption/decryption engine or the database. Users are thus protected from unauthorized accesses. Of course, such security is thus hinging on the protection of the pass code by a given user. To bolster security, an N-factor authentication procedure will be further explained herein.

Figure 4:
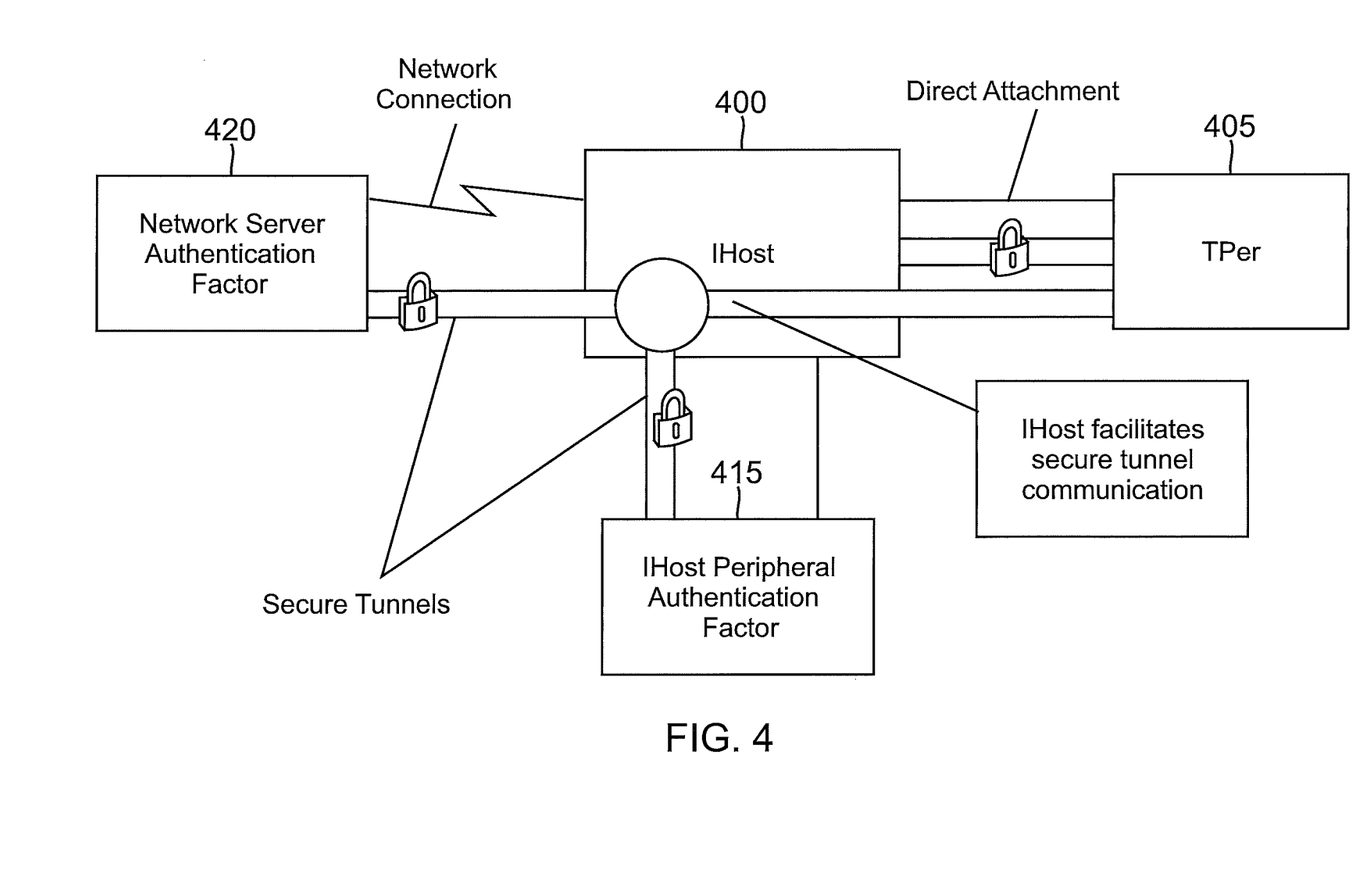
FIG. 4 illustrates a host microprocessor and an embedded encryption/decryption engine within a server of the system of FIG. 1 adapted to perform an n-factor authentication.

Turning now to FIG. 4, the communication paths for an N-factor authentication is illustrated. A host microprocessor 400 within server 120 communicates with embedded encryption/decryption engine 405 through, for example, a direct attachment. Host 400 and engine 405 authenticate each other through an authentication protocol such as using public/private keys or other suitable authentication protocols. Having authenticated each other, the communication channel between engine 405 and 400 may be referred to as a secure channel. As discussed earlier, a user on host may review the user records associated with database 115 associated with engine 405 such that the user responds to a particular user record by attempting to log on. As part of this log on, the user provides a pass code such as, for example, "username1." However, this single pass code is not sufficient in an N-factor authentication protocol, where N is a plural integer representing the total number of pass codes associated with a particular user record. These additional pass codes may be obtained, for example, from a USB drive dongle 415 and/or a network server 420 that may also communicate with host 400 through authenticated channels. Engine 405 then creates a single derive key from these N resulting pass codes as discussed further with regard to the process shown in FIG. 5.

Figure 5:
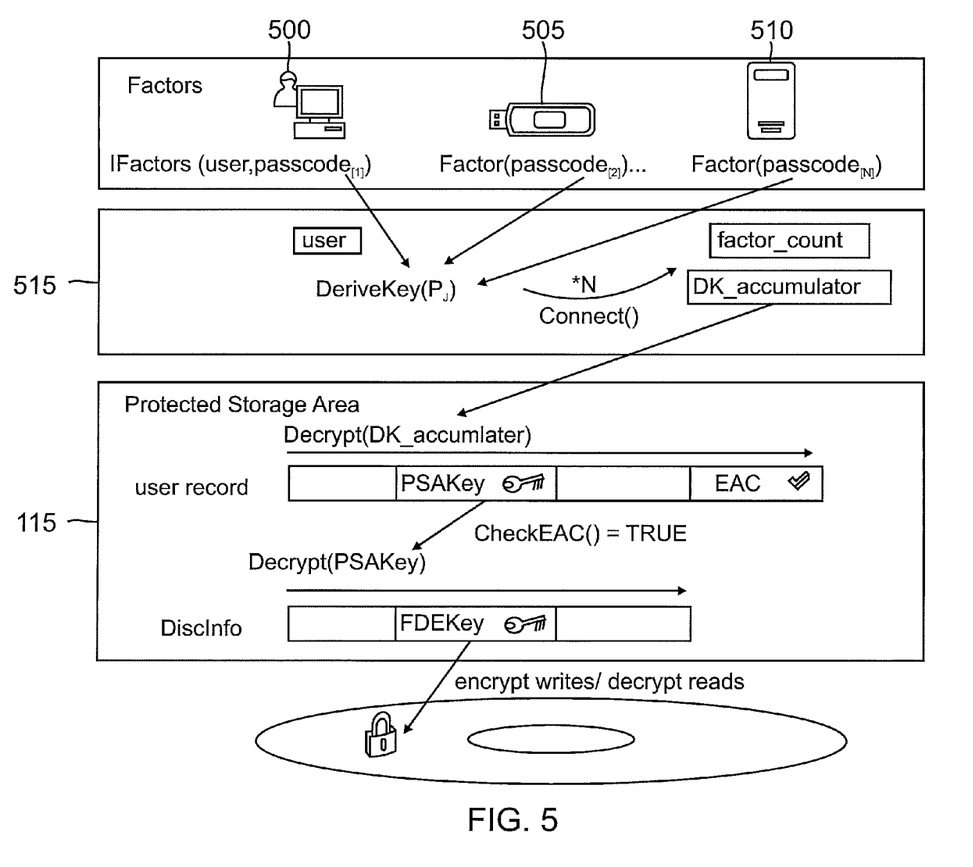
FIG. 5 illustrates additional details for the n-factor authentication of FIG. 4.

As seen in FIG. 5, the various factors such as entered by a user 500, a USB Flash dongle 505, and from a network server 510 are provided to the embedded encryption/decryption engine 515. In one embodiment, each pass code factor is hashed using a National Security Agency (NSA) hash function such as SHA-256 to create a corresponding derive key factor. The designation "factor" may also be replaced with the corresponding integer for the particular factor (from 1 to N for the various factors). These N factors are then combined such as through a logical XOR operation so as to produce a final DK, which may be designated as DK_accumulator to denote its result from a combination of the various derive key factors. Having thus recovered the ultimate DK, the engine may use it to decrypt the encrypted entries in the user record within a protected storage area in the database. If the integrity check matches, the user is thereby authenticated. The PSA key in the user record, having been decrypted by the DK_accumulator, may then be used by the engine to recover the FDE key. As compared to a single factor authentication scheme, such an N-factor authentication protocol is more robust in that, for example, suppose an unauthorized individual has gained access to the pass code. Unless that user also has the appropriate USB dongle as well as a host that may associate with the appropriate server (according to the example embodiment of FIG. 4), the mere possession of a single pass code is insufficient to be authenticated to the SP.

The above-described embodiments of the present invention are merely meant to be illustrative and not limiting. For example, although described according to conventional DVD format, system 100 may easily practice the HD-DVD or Blu-ray formats using the appropriate burner. It will thus be obvious to those skilled in the art that various changes and modifications may be made without departing from this invention in its broader aspects. For example, system 100 may be configured such that no second type of encryption is practiced. The data stored in the database would thus be only singly-encrypted. In such an embodiment, the required first key to remove the first type of encryption is still never stored in the database but instead would be remotely accessed using the content key server. Moreover, this first type of encryption need not be AES but instead could be Elliptic Curve Cryptography (ECC), Triple Data Encryption Standard (TDES), or some other suitable form of encryption. Furthermore, although described with regard to a retail store environment, system 100 is easily adapted for a manufacturing on demand (MOD) factory. In such a case, the database could substantially larger in that it would be desirable to limit the database size in retail environments to minimize cost—a centralized MOD need only maintain one database whereas a retail chain would require many separate databases. The appended claims encompass all such changes and modifications as fall within the true spirit and scope of this invention.

We claim:

1. A computer-implemented method for distributing content of a content provider by a distribution server, comprising the steps of:
receiving a user selection of one or more of a plurality of content, wherein the selected content is encrypted by a first encryption key that is unknown to the distribution server;
receiving and verifying payment information associated with the user selection;
retrieving the selected content from a remote database;
obtaining the first encryption key corresponding to the selected content to decrypt the encrypted content corresponding to the user selection, wherein decryption is performed by a hardware-based engine of the distribution server that is isolated from a host processor of the distribution server; and
encrypting the content corresponding to the user selection according to a second encryption key that is known to the distribution server;
wherein the first encryption key is configured in accordance with a first protocol and the second encryption key is configured in accordance with a second protocol that is distinct from the first protocol.

2. The method of claim 1, wherein the first encryption key comprises a DES (Data Encryption Standard) key.

3. The method of claim 1, wherein the second encryption key comprises an AES (Advanced Encryption Standard) key.

4. The method of claim 1, further comprising obtaining the second encryption key based on authenticating information.

5. The method of claim 1, further comprising decrypting the content with the second encryption key.

6. The method of claim 1, further comprising writing the decrypted content to a storage medium.

7. The method of claim 6, wherein the step of writing the content to a storage medium occurs on demand in response to the user selection.

8. The method of claim 1, wherein obtaining the first decryption key comprises obtaining the content decryption key from an entity controlled by the content provider.

9. The method of claim 8, wherein obtaining the first decryption key comprises obtaining the first decryption key from an entity controlled by the content provider in order to provide to the content provider a number of times each content of the plurality of content was downloaded.

10. A distribution server to distribute content of a content provider, the distribution server comprising:
a first component to receive a user selection of one or more of a plurality of content, wherein the selected content is encrypted by a first encryption key that is unknown to the distribution server;
a second component to receive and verify payment information associated with the user selection;
a third component to retrieve the selected content from a remote database;
a fourth component to obtain the first encryption key corresponding to the selected content to decrypt the encrypted content corresponding to the user selection, wherein decryption is performed by a hardware-based engine of the distribution server that is isolated from a host processor of the distribution server; and
a fifth component to encrypt the content corresponding to the user selection according to a second encryption key that is known to the distribution server;
wherein the first encryption key is configured in accordance with a first protocol and the second encryption key is configured in accordance with a second protocol that is distinct from the first protocol.

11. The server of claim 10, wherein the first encryption key comprises a DES (Data Encryption Standard) key.

12. The server of claim 10, wherein the second encryption key comprises an AES (Advanced Encryption Standard) key.

13. The server of claim 10, wherein the hardware-based engine obtains the second encryption key based on authenticating information.

14. The server of claim 10, wherein the hardware-based engine decrypts the content with the second encryption key.

15. The server of claim 10, further comprising a storage medium for storing the decrypted content.

16. The server of claim 15, wherein the storage medium stores the decrypted content on demand in response to the user selection.

17. The server of claim 10, wherein the hardware-based engine obtains the content decryption key from an entity controlled by the content provider.

18. The server of claim 17, wherein the hardware-based engine obtains the first decryption key from an entity controlled by the content provider in order to provide to the content provider a number of times each content of the plurality of content was downloaded.

19. A non-transitory computer readable medium storing instructions that, when executed by a processor, perform a computer-implemented method for distributing content of a content provider by a distribution server, the method comprising:
receiving a user selection of one or more of a plurality of content, wherein the selected content is encrypted by a first encryption key that is unknown to the distribution server;
receiving and verifying payment information associated with the user selection;
retrieving the selected content from a remote database;
obtaining the first encryption key corresponding to the selected content to decrypt the encrypted content corresponding to the user selection, wherein decryption is performed by a hardware-based engine of the distribution server that is isolated from a host processor of the distribution server; and
encrypting the content corresponding to the user selection according to a second encryption key that is known to the distribution server;
wherein the first encryption key is configured in accordance with a first protocol and the second encryption key is configured in accordance with a second protocol that is distinct from the first protocol.

* * * * *